United States Patent
Thompson et al.

(10) Patent No.: US 10,749,778 B2
(45) Date of Patent: Aug. 18, 2020

(54) COMMUNICATION SYSTEM DETERMINING TIME OF ARRIVAL USING MATCHING PURSUIT

(71) Applicant: Acorn Technologies, Inc., La Jolla, CA (US)

(72) Inventors: Steven C Thompson, San Diego, CA (US); Fernando Lopez de Victoria, San Francisco, CA (US)

(73) Assignee: ACORN TECHNOLOGIES, INC., La Jolla, CA (US)

( * ) Notice: Subject to any disclaimer, the term of this patent is extended or adjusted under 35 U.S.C. 154(b) by 896 days.

(21) Appl. No.: 14/811,507

(22) Filed: Jul. 28, 2015

(65) Prior Publication Data
US 2017/0034027 A1   Feb. 2, 2017

(51) Int. Cl.
*H04L 12/26*   (2006.01)
*G01S 1/04*    (2006.01)
(Continued)

(52) U.S. Cl.
CPC .......... *H04L 43/0858* (2013.01); *G01S 1/045* (2013.01); *G01S 1/20* (2013.01);
(Continued)

(58) Field of Classification Search
CPC ... H04W 76/046; H04W 64/00; H04W 4/008; H04W 76/023; H04W 8/005;
(Continued)

(56) References Cited

U.S. PATENT DOCUMENTS 5,619,212 A * 4/1997 Counselman, III .... G01C 15/00
                                                342/357.26
5,696,582 A * 12/1997 Barwald ............... G01J 3/4535
                                                356/451
(Continued)

FOREIGN PATENT DOCUMENTS

JP   2007/218857    8/2007
JP   2007/295621    11/2007
(Continued)

OTHER PUBLICATIONS

Löfgren, et al., "Improved Matching Pursuit Algorithm and Architecture for LTE Channel Estimation," May 15, 2011, pp. 466-469, 2011 IEEE International Symposium.
(Continued)

*Primary Examiner* — Jung Liu
(74) *Attorney, Agent, or Firm* — William H. Wright

(57) ABSTRACT

A wireless receiver receives location pilots embedded in received symbols and uses the location pilots to detect the first path for every base station the network has designated for the receiver to use in time of arrival estimation. The receiver preferably applies matching pursuit strategies to offer a robust and reliable identification of a channel impulse response's first path. The receiver may also receive and use estimation pilots as a supplement to the location pilot information in determining time of arrival. The receiver can use metrics characteristic of the channel to improve the robustness and reliability of the identification of a CIR's first path. With the first path identified, the receiver measures the time of arrival for signals from that path and the receiver determines the observed time difference of arrival (OTDOA) to respond to network requests for OTDOA and position determination measurements.

26 Claims, 8 Drawing Sheets

(51) Int. Cl.
  *G01S 1/20*  (2006.01)
  *H04L 25/02*  (2006.01)
  *H04W 64/00*  (2009.01)
  *G01S 5/02*  (2010.01)
  *H04L 5/00*  (2006.01)

(52) U.S. Cl.
  CPC .......... *G01S 5/0221* (2013.01); *G01S 5/0278* (2013.01); *H04L 5/0048* (2013.01); *H04L 25/0212* (2013.01); *H04L 25/0232* (2013.01); *H04L 43/028* (2013.01); *H04W 64/00* (2013.01)

(58) Field of Classification Search
  CPC . H04L 43/0864; G01S 5/0236; G01S 19/256; G01S 19/254; G01S 5/10
  See application file for complete search history.

(56) References Cited

U.S. PATENT DOCUMENTS

| | | | |
|---|---|---|---|
| 8,233,911 | B2 | 7/2012 | Charbit et al. |
| 8,634,363 | B2* | 1/2014 | Kim ............. H04L 5/0023 370/329 |
| 8,824,527 | B2 | 9/2014 | Thompson et al. |
| 8,897,353 | B2 | 11/2014 | Thompson et al. |
| 2005/0031021 | A1* | 2/2005 | Baker ............. H04B 1/71637 375/142 |
| 2007/0066231 | A1* | 3/2007 | Duffett-Smith ......... G01S 19/05 455/67.11 |
| 2009/0325598 | A1* | 12/2009 | Guigne ................. G01S 5/021 455/456.1 |
| 2010/0323717 | A1* | 12/2010 | Agashe ................... G01S 1/68 455/456.1 |
| 2011/0039574 | A1* | 2/2011 | Charbit ................. G01S 5/0215 455/456.1 |
| 2011/0105144 | A1* | 5/2011 | Siomina ................ G01S 5/0215 455/456.1 |
| 2011/0143770 | A1* | 6/2011 | Charbit ................. G01S 5/0036 455/456.1 |
| 2011/0143773 | A1* | 6/2011 | Kangas ..................... G01S 5/02 455/456.1 |
| 2012/0039409 | A1* | 2/2012 | Popovic ................ G01S 5/0226 375/260 |
| 2012/0040691 | A1* | 2/2012 | Han ........................ G01S 1/042 455/456.1 |
| 2012/0057498 | A1* | 3/2012 | Han ..................... G01S 5/0036 370/252 |
| 2012/0082252 | A1* | 4/2012 | Annavajjala .......... H04L 5/0007 375/260 |
| 2013/0303199 | A1* | 11/2013 | Siomina ................ H04W 64/00 455/456.5 |
| 2013/0336133 | A1 | 12/2013 | Carbonelli |
| 2014/0087754 | A1* | 3/2014 | Siomina .................. H04W 4/02 455/456.1 |
| 2014/0269882 | A1* | 9/2014 | Thompson .......... H04L 25/0212 375/232 |
| 2014/0269883 | A1 | 9/2014 | Thompson et al. |
| 2015/0092875 | A1* | 4/2015 | Kim ..................... H04B 7/0478 375/267 |
| 2015/0131544 | A1* | 5/2015 | Behravan .............. H04L 5/0048 370/329 |
| 2016/0050534 | A1* | 2/2016 | Lim ...................... G01S 5/0236 370/252 |
| 2016/0066174 | A1* | 3/2016 | Kim ..................... H04W 8/005 455/41.2 |
| 2016/0128029 | A1* | 5/2016 | Yang ................. H04W 56/0015 370/329 |

FOREIGN PATENT DOCUMENTS

| | | |
|---|---|---|
| JP | 2010/513872 | 4/2010 |
| WO | WO 2008/076728 | 6/2008 |
| WO | WO 2013/165916 | 11/2013 |
| WO | WO 2014/105324 | 7/2014 |

OTHER PUBLICATIONS

Thevenon, et al. "Positioning Using Mobile TV Based on the DVB-SH Standard" Sep. 1, 2011, pp. 71-90, Navigation: Journal of the Institute of Navigation, vol. 58, No. 2.

EPO, EP Search Report for 16 18 1206, dated Nov. 24, 2016.

Del Peral-Rosado, et al., "Preliminary analysis of the positioning capabilities of the positioning reference signal of 3GPP LTE." Proc. 5th Eur. Workshop on GNSS Signals and Signal Processing, 2011.

Del Peral-Rosado, et al., "Evaluation of the LTE positioning capabilities under typical multipath channels." 6th. IEEE, Advanced Satellite Multimedia Systems Conference (ASMS) and 12th Signal Processing for Space Communications Workshop (SPSC), pp. 139-146, 2012.

Del Peral-Rosado, et al., "Achievable localization accuracy of the positioning reference signal of 3GPP LTE." Proc. Intl Conf. on Localization and GNSS (ICL-GNSS), IEEE, 2012.

Del Peral-Rosado, et al., "Analysis of positioning capabilities of 3GPP LTE." Proceedings of the 25th International Technical Meeting of the Satellite Division of the Institute of Navigation (ION GNSS), 2012.

Del Peral-Rosado, et al., "Software-defined radio LTE positioning receiver towards future hybrid localization systems." Proc. AIAA ICSSC, 2013, pp. 1-11.

Del Peral-Rosado, et al., "Joint channel and time delay estimation for lte positioning reference signals." Proc. of $6^{th}$ ESA Workshop on Satellite Navigation Technologies and European Workshop on GNSS Signals and Signal Processing, (NAVITEC), pp. 1-5, IEEE, 2012.

Del Peral-Rosado, et al., "Comparative results analysis on positioning with real LTE signals and low-cost hardware platforms." Proc. of $7^{th}$ ESA Workshop on Satellite Navigation Technologies and European Workshop on GNSS Signals and Signal Processing (NAVITEC), IEEE, 2014.

Del Peral-Rosado, et al., "Joint maximum likelihood time-delay estimation for LTE positioning in multipath channels." EURASIP Journal on Advances in Signal Processing Jan. 2014 (2014): pp. 1-13.

Del Peral-Rosado, et al., "Evaluation of the LTE positioning capabilities in realistic navigation channels." Ph.D. Thesis, Autonomous University of Barcelona (2014), 164 pages.

Del Peral-Rosado, et al., "Downlink Synchronization of LTE Base Stations for Opportunistic ToA Positioning." Proc. Int'l Conf. on Localization and GNSS (ICL-LNSS), IEEE, 2015.

Fischer, "Observed Time Difference Of Arrival (OTDOA) Positioning in 3GPP LTE." Qualcomm Technologies, Inc., Technical report, Jun. 6, 2014, pp. 1-62.

Gadka, "New First—Path Detector for LTE Positioning Reference Signals," UBICOMM 2014; The Eight International Conference on Mobile Ubiquitous Computing, Systems, Services and Technologies; 2014, pp. 99-104.

Gentner, et al., "Particle filter based positioning with 3GPP-LTE in indoor environments." Position Location and Navigation Symposium (PLANS), 2012 IEEE/ION. IEEE, 2012, pp. 301-308.

Huang, et al., "Enhanced LTE TOA/OTDOA estimation with first arriving path detection." Wireless Communications and Networking Conference (WCNC), 2013 IEEE. IEEE, 2013, pp. 3992-3997.

Kangas, et al., "Positioning in LTE." Handbook of Position Location: Theory, Practice, and Advances (2012): pp. 1081-1127.

Le, et al., "An improved ToA estimation in compressed sensing-based UWB systems." 2010 IEEE International Conference on Communication Systems (ICCS), IEEE, 2010, pp. 249-253.

Li, et al., "Super-resolution TOA estimation with diversity for indoor geolocation." IEEE Transactions on Wireless Communications, 3.1 (2004): pp. 224-234.

(56) References Cited

OTHER PUBLICATIONS

Liu, et al., "Enhanced RSTD for scalable bandwidth of OTDOA positioning in 3GPP LTE." 2013 International Conference on Localization and GNSS (ICL-GNSS), IEEE, 2013.
Liu, et al., "RSTD Performance for Small Bandwidth of OTDOA Positioning in 3GPP LTE." Vehicular Technology Conference (VTC Fall), 2013 IEEE 78th. IEEE, 2013.
Maechler, et al., "Matching pursuit: Evaluation and implementation for LTE channel estimation." (ISCAS), Proceedings of 2010 IEEE International Symposium on Circuits and Systems, IEEE, 2010.
Mallat, et al., "Matching pursuits with time-frequency dictionaries." IEEE Transactions on Signal Processing, 41.12 (1993): pp. 3397-3415.
Manolakis, et al., "A closed concept for synchronization and cell search in 3GPP LTE systems." Wireless Communications and Networking Conference, 2009. WCNC 2009. IEEE, 2009.
Medbo, et al., "Propagation channel impact on LTE positioning accuracy." Proceedings of the Personal, Indoor and Mobile Radio Communications (PIMRC' 09) (2009): pp. 66-68.
Panchetti, et al., "Performance analysis of PRS-based synchronization algorithms for LTE positioning applications." 2013 10th Workshop on Positioning Navigation and Communication (WPNC), IEEE, 2013.
Prabhu, et al., "An improved ESPRIT based time-of-arrival estimation algorithm for vehicular OFDM systems." Vehicular Technology Conference, 2009. VTC Spring 2009. IEEE 69th. IEEE, 2009, pp. 1-4.
Prabhu, et al., "A Novel Pilot Aided Time of Arrival (TOA) Estimation Algorithm for Vehicular OFDM Systems in Specular Wireless Channels." GLOBECOM Workshops, 2008 IEEE. IEEE, 2008, pp. 1-5.
Xu, et al., "Maximum likelihood TOA and OTDOA estimation with first arriving path detection for 3GPP LTE system." Transactions on Emerging Telecommunications Technologies (2014).
Xu, et al., "Robust synchronization for 3GPP LTE system." Global Telecommunications Conference (GLOBECOM 2010), IEEE, 2010.
Zhang, et al., "A novel OTDOA positioning scheme in Heterogeneous LTE-Advanced systems." 2012 3rd IEEE International Conference on Network Infrastructure and Digital Content (IC-NIDC), IEEE, 2012, pp. 106-110.
"An Overview of LTE Positioning" Spirent; Feb. 2012, pp. 1-12.
Evolved Universal Terrestrial Radio Access (E-UTRA); LTE Positioning Protocol (LPP); ETSI TS 136 355 v10.0.0, Jan. 2011.
Evolved Universal Terrestrial Radio Access (E-UTRA); Base Station (BS) radio transmission and reception (3GPP TS 36.104 version 9.4.0 Release 9).
LTE; Evolved Universal Terrestrial Radio Access (E-UTRA); Radio Resource Control (RRC); Protocol specification (3GPP TS 36.331 version 10.7.0 Release 10).
R1-152934, "Opportunities for RSTD estimation error reductions" Acorn Technologies, May 2015, pp. 1-9.
"Positioning with LTE" Ericsson White Paper, Sep. 2011, pp. 1-12.
R1-152112, "UE Receiver Model for Performance Evaluation" Ericsson, Apr. 2015, pp. 1-6.
$3^{rd}$ Generation Partnership Project; Technical Specification Group Radio Access Network; Evolved Universal Terrestrial Radio Access (E-UTRA); Physical Channels and Modulation (Release 10); 3GPP TS 36.211 V 10.1.0, Mar. 2011.
Translation of Japanese Office Action in 2016-104083.

\* cited by examiner

COMMUNICATION SYSTEM DETERMINING TIME OF ARRIVAL USING MATCHING PURSUIT

BACKGROUND

1. Field of the Invention

The present invention relates to a system and method for determining position of a user terminal or other communication equipment based on time of arrival measurements in a wireless environment.

2. Description of the Related Art

Measurements of times of arrival (TOA) for signals from a set of wireless base stations can aid in determining a user's position or location. For example, an LTE (long term evolution) standard receiver can determine its location (or positioning) based on LTE signaling in a way that can replace or supplement GPS or WiFi-assisted positioning strategies.

The LTE positioning protocol, described for example in ETSI TS 136 355 version 10.0.0, which is referenced in release 10 of the LTE specification, embeds positioning reference signal (PRS) subcarriers into designated orthogonal frequency division multiplexing (OFDM) symbols over specified time intervals, sometimes called positioning occasions. The user equipment (UE) may measure the time of arrival (TOA) of PRS subcarriers from each accessible base station (which the LTE specification calls the eNodeB). The user equipment preferably measures at least one reference signal time difference (RSTD) between two different eNodeBs (one called the reference and the other called the neighbor). The reference signal time difference is related to the established measure for observed time difference of arrival (OTDOA) described in the LTE positioning protocol.

The reference signal time difference measurement is simple in concept. In practice, the measurement of any TOA from an eNodeB can be unreliable because of errors due to the severe multipath environment in wireless networks and the typically low signal-to-noise ratio (SNR). The increased density of base stations and users in an LTE network also increases the potential for measurement errors. Determining the position of user equipment proceeds by measuring the TOA of the first path from each eNodeB of interest followed by determining the reference signal time difference (RSTD) between pairs of designated eNodeB base stations using the respectively measured times of arrival at the user equipment. Depending on the particular configurations specified in the standard, the TOA and RSTD measurements may be made over a specified number of base stations and different corresponding combinations of RSTD measurements between ones of the set of base stations.

The difficulties that arise in measuring TOAs relate to identifying the first path arriving at a user equipment terminal (UE) from any designated eNodeB. It is common for a wireless channel's impulse response to consist of a small plurality of paths at varying amplitudes and delays relative to a first path. The strongest path in a wireless channel's impulse response may not be indicative of the true delay, since the first path may be of lower amplitude than the strongest path. In addition to the fact that the first path might not have the greatest amplitude, identification of the first path can be complicated by the likelihood of falsely identifying paths due to correlation with interference, high levels of noise, or both.

LTE's fundamental modulation scheme to transmit bits over the air uses OFDM. That is, bits are generated by applying quadrature amplitude modulation (QAM) to each active subcarrier that makes up an OFDM symbol. In practice, an LTE OFDM symbol may have 1024 time samples representing 600 active subcarriers out of a maximum of 1024 subcarriers. Each subcarrier may be assigned a function at the receiver, such as transmitting bits known a priori to the receiver and thus enabling different calculations. These calculations may include channel impulse response (CIR) estimation and positioning-related measurements.

FIG. 1 provides a functional block diagram of apparatus for determining position using observed time difference of arrival (OTDOA) based on the reference signal time difference (RSTD) measurement specified in LTE. The illustrated user equipment receiver 110 receives a plurality of OFDM symbols from two base stations 101, 103. Receiver 110 may use one or more antennas to receive the symbols. FIG. 1 illustrates the position determining functionality using as an example signals received from two base stations 101, 103 with the receiver 110 using a single antenna, which is the minimum configuration for an RSTD measurement. This configuration can be extended to a greater number of base stations and a greater number of user equipment antennas.

Because user equipment receiver 110 is compliant with the LTE standard, the receiver can process received OFDM symbols to provide best estimates of the transmitted bits. Such a receiver 110 can identify the first path using one or more first path identification (FP-ID) modules 130, 140, which are responsive to subcarriers assigned to calculate positioning information. Each first path identification module 130, 140 is responsive to information 132, 142 provided by the user equipment receiver 110 about the subcarriers to be used for positioning measurements. For example, the information may be stored within tables in non-volatile memory.

The first path identification units 130, 140 identify the respective first path for the received OFDM symbols from a known eNodeB. The reference signal time difference (RSTD) measurement typically is based on a predetermined duration of OFDM symbols to achieve the desired accuracy. In LTE, this may be over at least one sub-frame of OFDM symbols, which is specified to be fourteen OFDM symbols.

The output from each first path identification module 130, 140 is the time of arrival (TOA) at the user equipment of a signal from the corresponding base station. Generally, in LTE, the $RSTD_{k,j}$ between base stations indexed as k and j is determined as $$RSTD_{k,j} = TOA_k - TOA_j. \qquad \text{EQ. 1}$$

FIG. 1 shows that module 150 of the receiver 110 provides as its output 152 the equation 1 reference signal time difference computation. This output $RSTD_{0,1}$ 152 is the output 134 of first path identification module 130 minus the output 144 of first path identification module 140.

The calculation of $RSTD_{k,j}$ is simple given a reliable estimation of the $TOA_k$ and $TOA_j$, knowing the structure of the signal received at the first path identification FP-ID module 130, 140. The standard, such as the LTE standard, specifies the structure of the symbol, which can be generalized as shown in FIG. 2. Modern wireless systems that transmit from one source, such as a base station, to multiple users in the coverage area, require the transmission to be subdivided into "subchannels." This is not much different in concept than FM or AM radio transmission; however, wireless transmission has a goal of very high bits/Hertz for a given spectrum. In the case of modern wireless technology, specifying channels can be achieved using orthogonal schemes, which include OFDM and code division multiple access (CDMA). In the near future the wireless standards may increase capacity by using quasi-orthogonal channels achieved in myriad spatial and temporal strategies.

FIG. 2 simplifies the explanation of the signals involved in an observed time difference of arrival (OTDOA) measurement by showing a method that assumes orthogonal channelization. That is, while orthogonality is retained, the crosstalk between channels is kept to insignificant levels.

The FIG. 2 horizontal axis 201 represents time, qualitatively representing the time occupied by received symbols. FIG. 2's vertical axis shows a second channel dimension such that FIG. 2 qualitatively shows channels as having no overlap. The vertical axis channel separation can represent segments of frequency, as in the case of OFDM, or the indexing of different codes in CDMA. For example, in the present LTE standard, the segmentation in the frequency axis can represent 15 kHz of bandwidth for a subcarrier, with an OFDM symbol possibly consisting of up to 600 active subcarriers out of 1024 total subcarriers in one symbol. This is only an example and other allocations are known. Thus, for example, the extent of each square in FIG. 2 can represent 15 kHz (y-axis) by 71.4 µs (x-axis) in the frequency-by-time grid. The value 71.4 µs is determined by the 1000 µs duration of an LTE sub-frame divided by the number 14 of OFDM symbols specified as making up an LTE sub-frame. In LTE terminology, each 15 kHz (y-axis) by 71.4 µs (x-axis) block in the grid is called a resource block (RB).

The following discussion of FIG. 2 focuses on OFDM transmission, but it should be appreciated that FIG. 2 can equally illustrate other transmission systems. For example, FIG. 2 can illustrate other orthogonal schemes such as CDMA transmission as well as quasi-orthogonal transmission strategies such as those proposed for next generation wireless (5G). The orthogonal or quasi-orthogonal transmission strategies might be used for subchannels or for signaling related to observed time difference of arrival (OTDOA) measurements, among other transmission strategies.

To allow for user equipment terminals to determine position by computing OTDOA, certain wireless standards assign subcarriers in the grid to be used for determining position or accomplishing OTDOA functionality. To simplify this discussion, exemplary OTDOA subcarriers are designated as "location pilots" (LP) 212, 214, 216 in FIG. 2. The term pilot is used to denote a subcarrier with a known transmit modulation at the receiver. These pilot subcarriers are in contrast to data subcarriers, which have unknown modulation characteristics because they are encoded with unknown information bits. This pilot scheme allows a compatible terminal to accomplish various measurements. User equipment terminals generally need to estimate the channel impulse response (CIR) and other parameters for successful reception and demodulation of OFDM symbols. Consequently, the grid shown in FIG. 2 likely contains other subcarriers designated as pilots. These persistent pilots are denoted as estimation pilots (EP) and are indicated as 221, 223, 225 in FIG. 2. In LTE, these locations, and EP modulating bits, are known at the receiver because they are dictated by the LTE specification.

While the user equipment is guaranteed to receive the location pilots at the time of a request for OTDOA measurement, the number of estimation pilots present will vary by configuration of the user equipment in the network. In the context of LTE, the location pilots are designated as positioning reference signals (PRS), and the estimation pilots are designated as common reference signals (CRS). In the LTE scheme, the user equipment receiver will always receive at least one set of CRS subcarriers in a sub-frame, and possibly may receive additional sets of subcarriers. It is reasonable to consider that a user equipment receiver can receive up to four CRS sets in a sub-frame. In the nomenclature of LTE, these sets are called "antenna ports." Normally, CRS subcarriers are used for channel impulse response (CIR) estimation, among other parameter estimations. Another property of the grid shown in FIG. 2, as it applies to LTE, is that the CRS and PRS are distributed on the 600-by-14 grid, and need not be contiguous in time or frequency. FIG. 2 shows arbitrarily positioned location pilots and estimation pilots consistent with this observation.

SUMMARY OF THE PREFERRED EMBODIMENTS

An aspect of the preferred embodiments provides a method of determining time of arrival in a wireless network. The method includes receiving at a receiver from a wireless network a request for time of arrival information, extracting location pilot symbols from a received signal, identifying a first path associated with the location pilot symbols using matching pursuit and determining a time of arrival based on the first path identified using matching pursuit. The receiver then communicates information responsive to the time of arrival based on the first path from the receiver to the wireless network.

Another aspect of the present invention provides a receiver with a time of arrival function. The receiver including a memory coupled to store extracted location pilot symbols and an interpolator coupled to receive the extracted location pilot symbols and to generate virtual location pilot symbols. A multi-symbol correlator correlates the extracted location pilot symbols and the virtual location pilot symbols with a reference signal and outputs an initial location pilot channel impulse response. A matching pursuit estimator providing a channel impulse response estimate responsive to the initial location pilot channel impulse response. A time of arrival estimator responsive to the matching pursuit estimator to identify a first path and to determine a time of arrival for the first path.

DETAILED DESCRIPTION OF THE PREFERRED EMBODIMENTS

Figure 1:
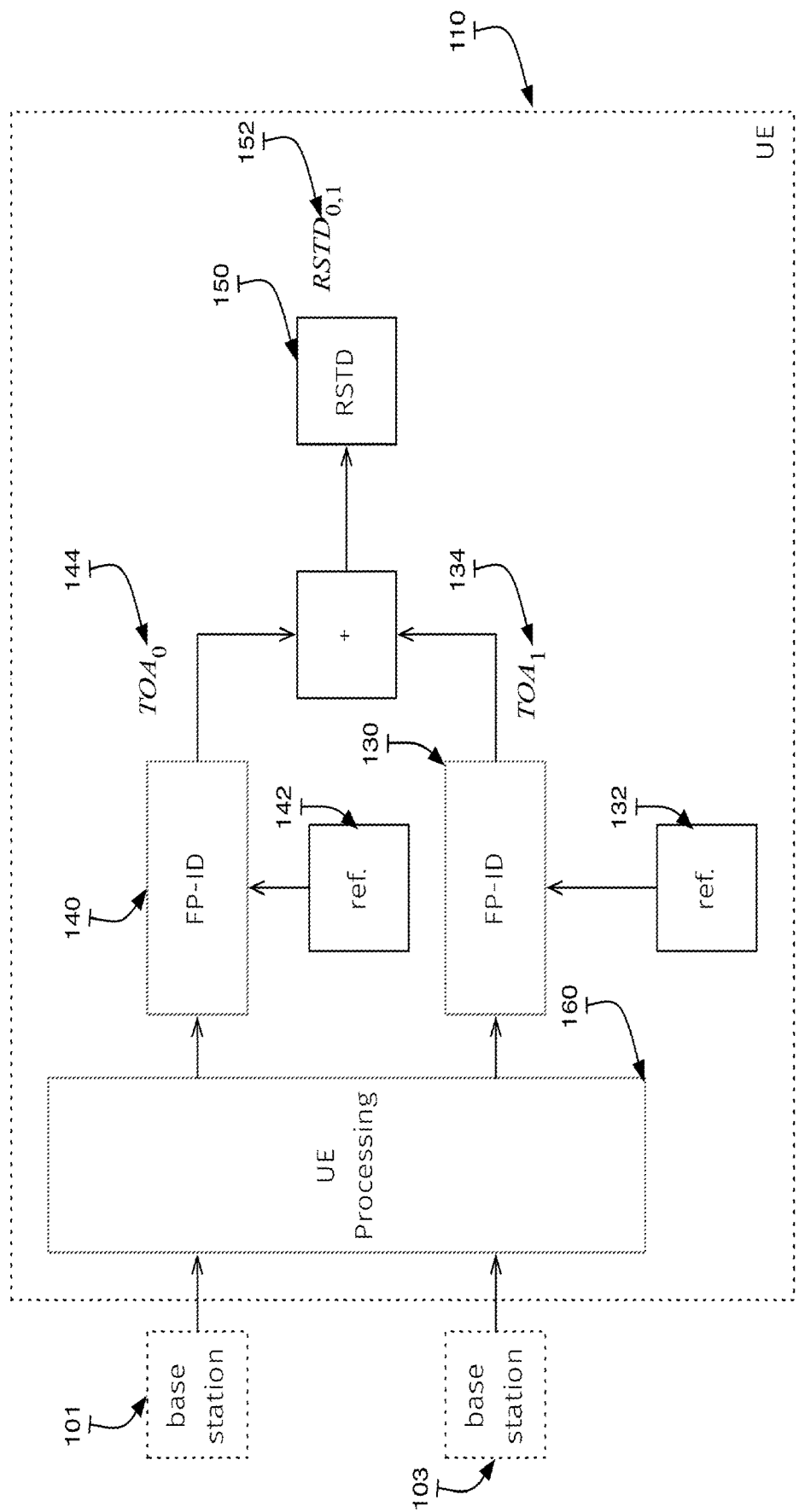
FIG. 1 is a block diagram of apparatus to perform an observed time difference of arrival (OTDOA) measurement between two base stations using a single antenna receiver.

Aspects of the present invention provide communication apparatus and communication methods for measuring time of arrival (TOA) at a wireless receiver. A wireless network operating with a preferred wireless receiver according to a given standard may use this time of arrival measuring system to determine the receiver's position. The preferred wireless receiver preferably reacts to symbols designated in accordance with the standard to perform time of arrival measurements. A preferred receiver may, for example, measure time of arrival values and use those values to determine an observed time difference of arrival (OTDOA) between transmitting base stations, which can be transmitted to the network to provide position information relative to the base stations.

In accordance with other aspects, a system or method preferably may measure time of arrival from a plurality of transmitted pilots, defined as subchannels and having modulation a priori known to the receiver. These transmitted pilots may preferably include pilots or signals other than the location pilot signals specified by the standard for use in measuring time of arrival.

A preferred implementation of a time of arrival measuring system or method uses one or more strategies for estimating the first path from each designated base station. These strategies may, for example, include applications of iterative matching pursuit (MP) to identify the first path in a wireless channel's impulse response for each transmitting base station assigned to a receiver.

In accordance with other aspects, a preferred system or method may control matching pursuit iterations to improve the robustness and reliability of the first path identification. This system or method may evaluate metrics to determine when interference or noise may be detrimental to the identification of first paths and may take responsive action to improve the quality of the first path identification and information. This system or method may also use information from a time domain channel estimator to identify or characterize the interference or noise.

A system or method for determining position based on measuring time of arrival uses a signaling method embedded into a multiple access scheme and a receiver that can measure the first path in the channel impulse response (CIR) to compute the reference signal time difference (RSTD) between any given pair of base stations.

The time of arrival is preferably determined from the first path measurement using the knowledge that the wireless standards define and transmit symbols with a rigid timing structure. For example, in long term evolution or LTE systems using orthogonal frequency division multiplexing (OFDM) symbols, the OFDM symbols are grouped into subframes and each subframe can last 1000 μs in one common configuration. Each subframe is divided into two slots, each lasting 500 μs, and each slot contains seven OFDM symbols. Each slot has a defined structure of samples that make up the OFDM symbols and additional overhead samples. The receiver knows the time at the beginning of each slot through synchronization schemes detailed in the LTE standard. Each sample is known to be of six microseconds duration. Thus, with the time known for the beginning of a slot, the first path determines the offset duration in terms of samples, or a scale thereof, from the beginning of the established time for the associated processed slot or slots. In turn, this determines the time of arrival at the receiver. That is, the time of arrival can be determined from the first path identification by referring to the time scale set by the subframe start, counting the number of samples from the time reference until the first path and converting that to a time using the sampling rate. As discussed below, it is also possible to make a fractional determination between sample times when greater accuracy for time of arrival or receiver position is desired.

A system or method for determining times of arrival preferably reacts to the presence of pilots embedded in the received symbol to detect the first path from each base station assigned to a receiver (user equipment) for time of arrival estimation. An exemplary system or method preferably applies matching pursuit (MP) strategies to offer a robust and reliable identification of a channel impulse response's first path. Further aspects of these matching pursuit strategies include controlling the matching pursuit iterations to mitigate degradations due to interference or noise. Other aspects may advantageously react to information from a time domain channel estimator to improve upon the robustness and reliability of the identification of a CIR's first path. With the first path identified, the receiver measures the time of arrival for signals from that path and the receiver's observed time difference of arrival (OTDOA) estimator responds to network requests for OTDOA measurements and position determinations.

Figure 3:
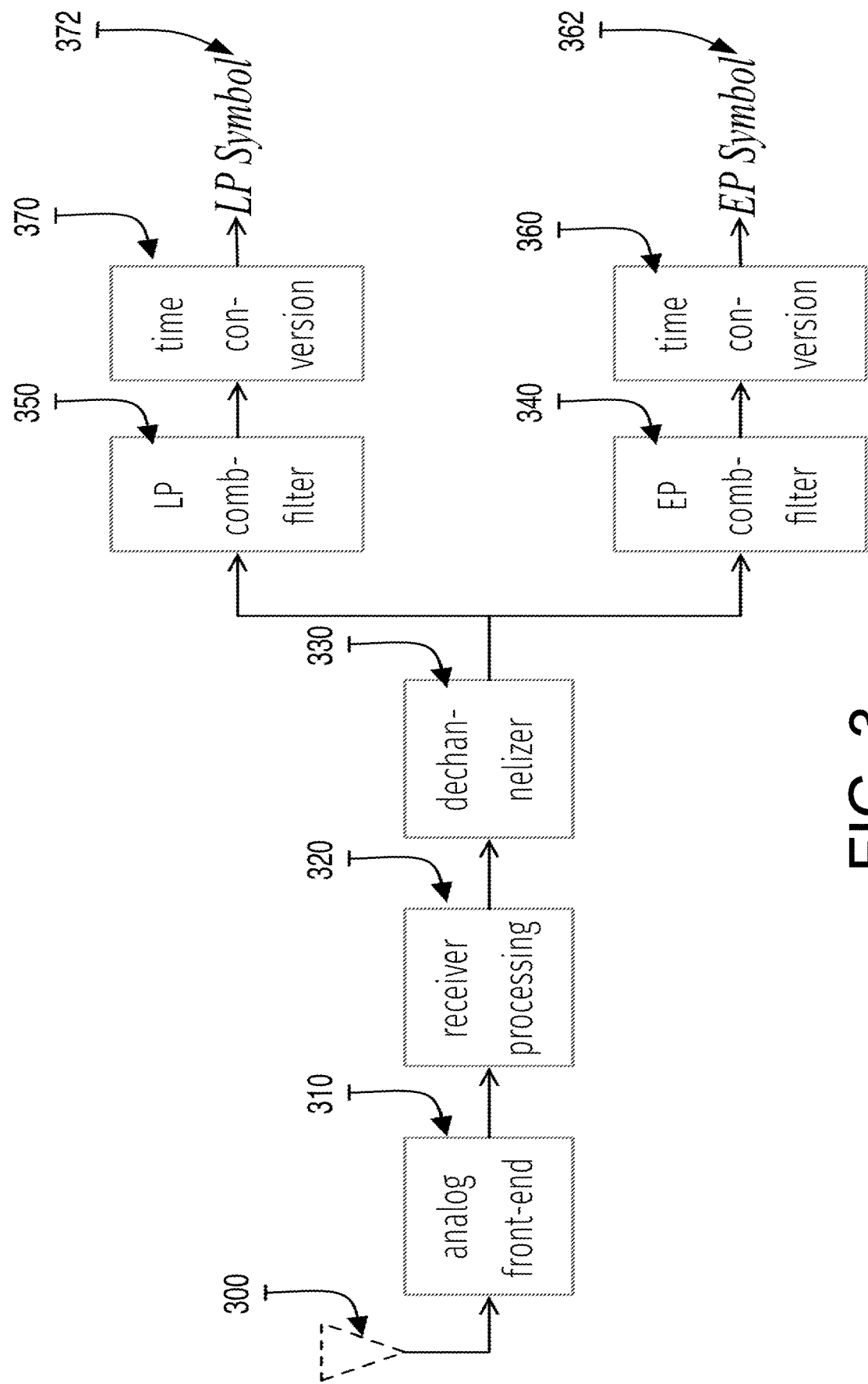
FIG. 3 shows a functional block diagram to extract the location and estimation pilots from a received sequence of symbols

Any wireless receiver must extract specified subchannels from a received symbol according to an established standard as part of recovering transmitted information bits. Consequently, the typical wireless receiver naturally performs an estimation pilot extraction process similar to that used for extracting location pilots (LP) in the process of measuring time of arrival. Preferred embodiments of a wireless receiver preferably extract location pilots and particularly preferred receivers further also extract estimation pilots (EP) so that both LP and EP information can be used to improve estimation accuracy. FIG. 3 shows how the receiver extracts location and estimation pilot information from received OFDM or other symbols. A receiver as shown in FIG. 3 preferably extracts and provides time domain symbols 372 consisting only of LP subchannels, with other subchannels removed. Further preferred embodiments can provide time domain symbols consisting only of EP subchannels 362, with other subchannels removed. These filtered symbols simplify and so facilitate the time of arrival measurements.

A wireless receiver incorporates circuitry to receive transmissions from a base station with at least one antenna 300. Analog circuitry 310 conditions the received signal and provides a digital representation, via quantization, of the received analog waveform. While FIG. 3 shows a single antenna 300 and corresponding analog circuitry 310, other implementations provide replicas of antenna 300 and analog circuitry 310 to provide the receiver with a plurality of antennas and corresponding front end circuitry to advantageously increase the receiver performance using the resulting plurality of antennas. Whether in a single antenna or multiple antenna configuration, the receiver's front end circuitry such as 310 outputs a digitized signal that is then processed through corresponding receiver processing circuitry 320 to acquire the transmitted symbol with the highest signal-to-noise ratio (SNR), for example, by using well-known processing.

Estimating the time of arrival using the FIG. 3 receiver does not require demodulation of the location pilot (LP) or, if present, estimation pilot (EP), as must be done for information-bearing subcarriers. Regardless, the receiver preferably extracts the LPs and, if present and they are to be used, the EPs from the incoming symbol by "zeroing" all other subchannels. The utility of "zeroing" all other subchannels is illustrated by an example of the OFDM modulation used in the LTE standard. An OFDM receiver has knowledge of the LP and EP subcarriers present in any given symbol, for example, among a possible 600 candidate subcarriers within a 1024 sample symbol. The OFDM receiver does not have knowledge of the other (non-pilot) symbols and so cannot determine how those other symbols were affected by the channel. Comb filtering 340, 350 can be applied to frequency domain representations of the respective symbols, whereby all frequency subcarriers not identified as LP subcarriers are given a value of zero, and the 1024 sample symbol is created with only LP subcarriers active as having their received values. This procedure is repeated for the subcarriers when EP subcarriers are present and are desired to be used. This allows the receiver to process all of the pilot symbols about which it has information, without interference from the unknown information associated with the other (non-pilot) symbols.

Referring to FIG. 3, the receiver processing circuitry provides the digitized and acquired symbols to dechannelizer circuitry 330, which processes the digitized and acquired symbols so that they can be recognized and processed. The dechannelizer circuitry 330 presents all active subchannels in parallel to the location pilot (LP) comb filter 350, which zeroes all non-LP subcarriers. The LP comb filter 350 provides the processed output including the extracted LP subcarriers to time converter 370 that converts the processed output to a time domain symbol, LP symbol 372. For OFDM symbols, the dechannelizer circuitry 330 performs a fast Fourier transform (FFT) on the input OFDM time samples, and the time converter 370 is an inverse FFT. Comb filtering is most efficiently performed in the frequency domain for the illustrative OFDM waveform. Corresponding strategies to extract the LP and estimation pilot (EP) subcarriers from signals for other transmission schemes, such as CDMA and quasi-orthogonal channeling, are alternately implemented in corresponding receivers for those technologies. The output from the time converter 370 is an LP symbol 372, which has the structure of a time domain OFDM symbol having a number of samples to make it equal in length to the symbol input to the dechannelizer circuitry 330. The LP symbol only has information about the location pilots. Likewise, the output from the time converter 360 is an EP symbol 372, which has the structure of a time domain OFDM symbol having a number of samples equal in number (length) to the symbol input to the dechannelizer circuitry 330.

In the specific case of LTE transmission, the receiver front end processor 320 performs the acquisition of timing and strips the cycle prefix required for OFDM modulation from the received samples. The dechannelizer circuitry 330 is an FFT, and the LP comb filter 350 zeroes all non-PRS (positioning reference signal) subcarriers. Time converter 370 takes an inverse FFT of the samples provided to it. Similar functions are performed by the EP comb filter 340, which preserves the common reference signal (CRS) subcarriers and zeroes other subcarriers, and the time converter 360, which performs an inverse FFT on the output of the comb filter 340 so that EP symbol 362 is output in the time domain.

In some implementations, the FIG. 3 and other preferred receivers react at least to the LP symbol 372, and preferably also simultaneously react to the EP symbol 362. For an LTE implementation of the FIG. 3 receiver, the receiver preferably reacts to at least the PRS symbol represented by LP symbol 372, and preferably simultaneously reacts to the CRS symbol represented by EP symbol 362. For an LTE implementation of the FIG. 3 receiver, the receiver may also react to at least the CRS symbol represented by EP symbol 362, particularly when the PRS symbol represented by LP symbol 372 is absent. For receivers that have multiple antennas, the receivers preferably perform the procedures illustrated in FIG. 3 for each of the receivers' physical antennas. If two or more antennas are present, then there will be an LP symbol 372 for each antenna. The same will apply to the EP symbol 362, so that there will be one such signal for each antenna.

The above and following descriptions focus on determining time of arrival and determining position using location pilots as a primary resource while also using estimation pilots and other information as supplements to the location pilot symbols. There are situations where it is preferred to use only estimation pilots or, at least, to use estimation pilot information as a primary resource for time of arrival measurements. For example, there are important situations in LTE systems where the network or the receiver preferably determines time of arrival estimates only from CRS (estimation) pilot symbols. This is particularly true, at least for symbols or situations where location pilot information is not available, but is also more generally true. One specific application that benefits from using CRS pilot symbols for time of arrival measurements is in the receiver (user equipment) assisted positioning technique where the receiver reports a receiver-determined time of arrival to the network and then the network determines the receiver location. Another application is when the receiver determines its location without network assistance with the receiver estimating the time of arrival (distance) of surrounding eNodeBs (base stations) and then solving the navigation equations locally. For this application, the receiver needs to know the coordinates of the eNodeBs. It can also be desirable for a receiver (user equipment) to determine a CRS-based time of arrival to provide fine timing for standard baseband receiver processing (to recover user bits, decoder control messages, etc.).

Figure 4:
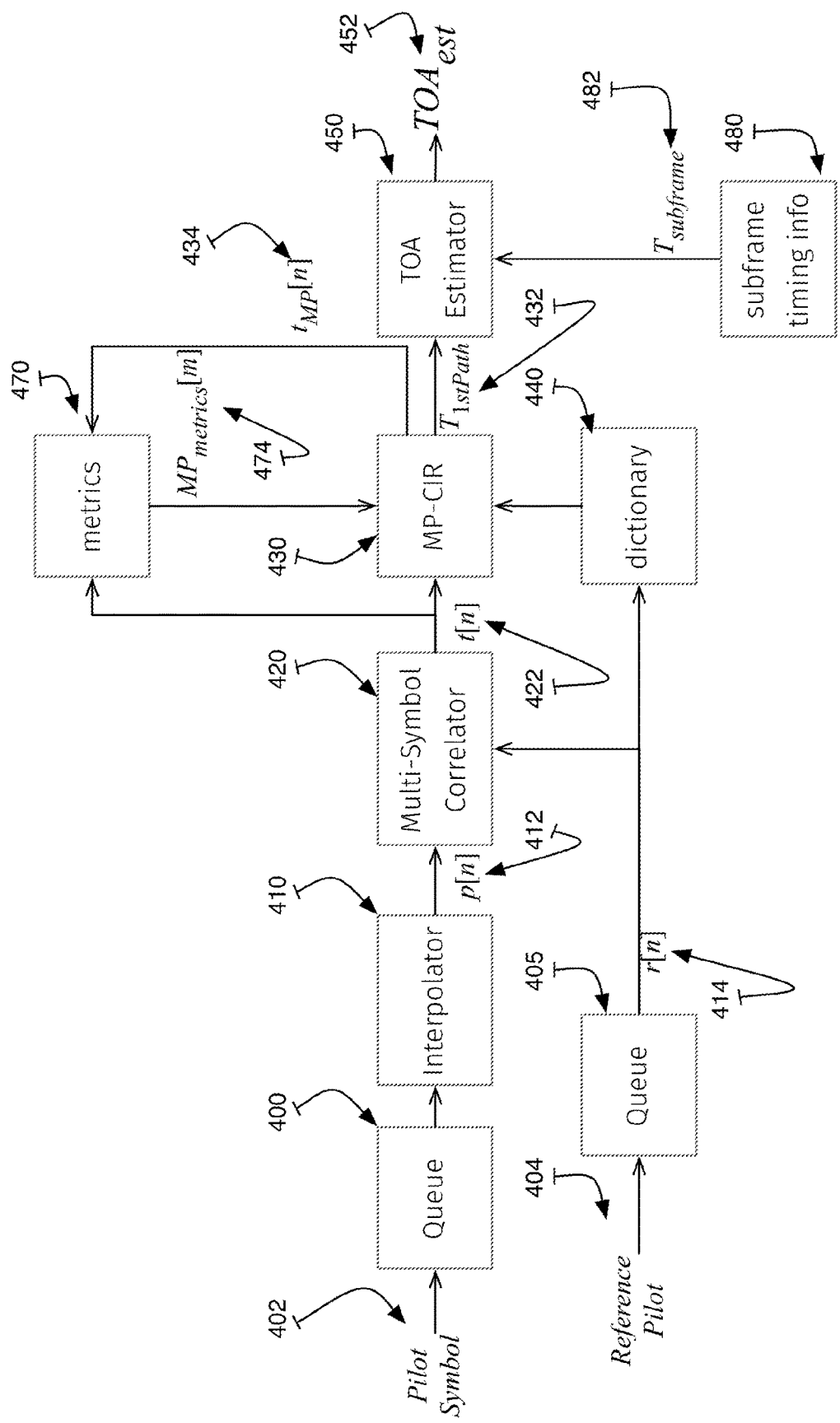
FIG. 4 shows the matching pursuit channel impulse response (MP-CIR) time of arrival estimator used to estimate the time of arrival for each antenna and each LP (EP) symbol individually.

FIG. 4 shows an implementation of a receiver that estimates time of arrival using a matching pursuit strategy. The FIG. 4 implementation may be considered as including a "stream" time of arrival estimator, where stream signifies that estimation is performed using location pilot (LP) or estimation pilot (EP) subchannels received at one antenna in the receiver from a single base station. In the FIG. 4 implementation, each of the available streams of LP symbols 372 and EP symbols 362 is processed individually with a matching pursuit (MP) iterative strategy to identify the first path in the channel impulse response (CIR) and to estimate the time of arrival (TOA).

The FIG. 4 receiver includes a queue 400 that stores the LP 372 symbols, EP symbols 362 or both for the selected antenna(s) and pilot type(s) the receiver uses for the TOA estimation. The LP 372 and EP 362 symbols are extracted as discussed above and as illustrated in FIG. 3. The particular symbol for TOA measurement is denoted in FIG. 4 generically as the received pilot symbol 402. Preferably the receiver is configured to provide one or more sets of the circuitry shown in FIG. 4 as appropriate to the antennas and desired pilots, for example, providing one replica of the FIG. 4 circuitry per stream of pilot symbol and antenna. Alternatively, the receiver illustrated in FIG. 4 could implement a time-sharing method for processing multiple streams of pilot symbols using partially or completely common circuitry, depending on the requirements and computational delays in estimating all times of arrival for signals from all of the base stations.

In a preferred implementation, the FIG. 4 receiver includes a pilot interpolator 410 that can provide pilot information for instances when the received symbol does not contain a pilot. For example, in the case of LTE, not all 14 symbols in a subframe have LPs or EPs present. Thus, the pilot interpolator 410 preferably determines virtual pilots for symbols where an LP or EP is not present. The process of interpolating uses the values of pilots from other symbols to estimate the value of a "virtual" pilot positioned within the desired symbol. Further discussion of interpolation and appropriate interpolation circuitry is discussed in U.S. Pat. No. 8,897,353, which is incorporated here by reference in its entirety and for all purposes. Preferably the interpolation strategy is selected for the given performance and pilot density to achieve the target first path identification (FP-ID) performance. The receiver preferably performs pilot interpolation calculations to generate virtual pilots for each of the received symbols so that the receiver provides a location or estimation pilot value (actual or virtual) in each segment for determining a time of arrival. Preferably the pilot density is selected to provide sufficient signal quality to allow for time of arrival measurements to be made in the expected signal to noise environment for receiver operation.

The multi-symbol correlator 420 performs time domain correlation between the concatenated and interpolated time domain signal p[n] 412 and a locally provided reference signal r[n] 414. p[n] 412 includes the comb filtered time domain LP and, when used, EP signals concatenated into a stream and preferably including added virtual pilot signals. The receiver generates or stores r[n], which is generated based on knowledge of the (standard-dictated and interpolated) LP and EP pilot positions and their intended modulation to produce an idealized set of expected pilot values and positions. The correlation between p[n] 412 and r[n] 414 would produce a single spike at the time alignment if the received signal p[n] 412 had its idealized form created by passing through an idealized channel and received by an ideal receiver. This idealized correlation can be represented as:

$$t[n] = \Sigma_{l=0}^{L} p[l] r^*[l+n].$$  EQ. 2

The correlation of equation 2 can be determined in various ways, generally with a goal of reducing computational complexity, given the length of the correlation t[n] and the concatenated symbol lengths L. For example, the correlation may be determined using fast Fourier transform strategies. Preferably the multi-symbol correlator 420 performs a correlation over multiple OFDM symbols containing location pilot symbols 372, estimation pilot symbols 362 or both. The practical, real channel correlation performed in the multi-symbol correlator 420 will not be ideal and will require further processing to accurately characterize the pilots and the channel over which they were transmitted. That further processing is preferably performed using matching pursuit strategies.

Various schemes are defined in standards that allow wireless receivers to determine the values present in the LP and EP subchannels. These standard-dictated values are stored local to the receiver and, with the interpolated pilot information, determine the corresponding reference pilot symbols 404 that are stored in the queue 405. The multi-symbol correlator 420 receives r[n] and p[n] and performs correlation for the duration of the symbols designated for the time of arrival measurement, which in the case of LTE may have a duration of fourteen symbols. The output t[n] 422 of the correlator 420 is then provided to the matching pursuit channel impulse response estimator 430, which evaluates the channel impulse response using matching pursuit techniques and outputs an improved channel impulse response estimate. More specifically, the matching pursuit estimator 430 receives the correlation output by correlator 420 as an input to the matching pursuit process and the estimator 430 processes the correlation output t[n] 422 to extract channel impulse response information from the correlation output t[n] 422. Estimator 430 thus determines a channel impulse response and outputs an identification of the first path $T_{1stPath}$ 432 that allows the time of arrival estimator 450 to determine the relative time delay of that first path. The time of arrival estimator 450 may, for example, establish a time reference 482 at the beginning of the slot (subframe or frame) 460 relevant to the observed first path and then identify (count from the time reference) the sample associated with the first path and establish the time of arrival 452 from the sample count and the sampling rate.

Matching pursuit is an effective strategy for detecting the presence of signals that contain properties stored in a dictionary 440. Matching pursuit iterates through a process to reconstruct a signal with a minimum of dictionary "words." The pseudo-code for the matching pursuit procedure can be as follows:

| Matching Pursuit Pseudocode |
|---|
| 0.  define a dictionary to represent the signals of interest; |
| 1.  candidate_signal= 0; |
| 2.  observed_signal= input_signal; |
| 3.  while stopping_criterion is not met do: |
|     3.1  find best_dictionary_word for the working_signal; |
|     3.2  candidate_signal= candidate_signal + best_dictionary_word; |
|     3.3  observed_signal= observed_signal − scaled best_dictionary_word; |
|     3.4  compute stopping_criterion; |
| 4.  end while. |

Applying this framework to the FIG. 4 receiver, the receiver identifies the correlator output t[n] 422 as the input signal in step 2 and the dictionary 440 is based on the pilot reference r[n]. As evident from step 3.4 of the matching pursuit pseudocode, it is important to find a good stopping criterion that does not end prematurely and does not continue beyond the level needed to establish a desired level of fidelity for the candidate_signal.

Preferably a receiver or receiving method implements matching pursuit using a stopping criterion based on the estimated signal to noise ratio, as determined by the SNR metric 470 from either the unprocessed correlation t[n] output by the multi-symbol correlator 420 or the processed and improved multi-symbol correlation $t_{MP}[m]$ 474 output from the matching pursuit processor 430. For an initial state of receiver operation, the SNR metric processor 470 preferably determines an initial signal to noise ratio from the first multi-symbol correlation. For example, an initial signal to noise ratio might be determined from:

$$SNR[0] = \frac{|\max\{t[l]\}|^2 \cdot (L+1)}{\sum_{l=0}^{L}(|t[l]|^2 - |\max\{t[l]\}|^2)}.$$ EQ. 3

For subsequent iterations, the improved multi-symbol correlation $t_{MP}[m]$ 474 is preferably substituted for each instance of the initial multi-symbol correlation t[n] in the equation 3 calculation and the signal to noise ratio is calculated from that modified equation. This signal to noise metric can be viewed as the ratio of power in the signal paths to the power in the no-signal paths.

As discussed above, the MP-CIR estimator 430 preferably implements matching pursuit to identify the paths and delays in the received signals using the output of the correlator 420 and the dictionary 440. In the FIG. 4 receiver, the matching pursuit process preferably follows the pseudocode as stated above, with the dictionary 440 preferably constructed based on the multiple-access scheme for each subchannel. For example, in the case of the OFDM waveform used in LTE, each active subcarrier index in the FFT preferably constitutes a dictionary 440 "word," in part or in whole. The FIG. 4 matching pursuit process may then use a dictionary matrix made up of such FFT subcarriers as dictionary words. The construction of the dictionary for OFDM signaling proceeds as illustrated in section III of Maechler, et al., "Matching Pursuit: Evaluation and Implementation for LTE Channel Estimation," *Proc. 2010 IEEE Int. Symp. on Circuits and Systems* 589-592 (2010). Other dictionaries can be implemented for any type of signal used for a multiple access wireless scheme. Further discussion of matching pursuit and the construction of appropriate dictionaries is discussed in U.S. patent publication No. 2014/0269883, which publication is incorporated by reference here in its entirety for all purposes including for implementation of matching pursuit and construction of dictionaries. Since the resulting matching pursuit dictionary generally consists of non-orthogonal column vectors, it is well-suited for future wireless standards with quasi-orthogonal subchannels.

Other matching pursuit strategies are known and would also be suitable for implementing the matching pursuit channel impulse response (MP-CIR) estimator 430. Such other strategies are selected to be consistent with the specific conditions in the relevant wireless standard. The MP-CIR estimator 430 preferably implements the matching pursuit pseudocode discussed above due to its simplicity among MP strategies.

Translation of pseudocode like that above into circuitry is within the capabilities of persons of ordinary skill in this art. It will be appreciated that this procedure could be implemented through software in a processor or it could be implemented in circuitry in combination with memory. Where desirable or advantageous, the procedures discussed here can be implemented as hardware through, for example, a hardware design language. Alternately, the above procedures can be readily implemented in a digital signal processor or other processor that processes communication signals within a communication system. Those of ordinary skill will appreciate that the receiver described here can be implemented in a mixture of hardware and software elements as selected to achieve different objectives such as computational efficiency and power efficiency.

For a single base station and a single antenna receiver and for the designated LP or EP received pilot symbols 402 a stream matching pursuit time of arrival estimator 450 (FIG. 4) will provide one measurement of time of arrival (TOA). Consequently, a single base station will produce a plurality of TOA measurements consisting of at most twice as many calculations as the number of antennas at the receiver. Given N base stations requiring TOA measurements, and labeling TOA measurements from 1 to K for each base station, then the TOA for base station n ($1 \leq n \leq N$) based on EP or LP calculations is, $TOA_{n,EP} = \text{minimum}(TOA_{n,1,EP}, TOA_{n,2,EP}, \ldots, TOA_{n,k,EP}, \ldots, TOA_{n,K,EP})$ $TOA_{n,LP} = \text{minimum}(TOA_{n,1,LP}, TOA_{n,2,LP}, \ldots, TOA_{n,k,LP}, \ldots, TOA_{n,K,LP})$ $TOA_n = \text{minimum}(TOA_{n,EP}, TOA_{n,LP}).$ EQ. 4

Equation 4 is flexible. Other formulations for $TOA_{n,Ep}$ and $TOA_{n,Lp}$ can be implemented that are appropriate for different wireless standards.

Figure 5:
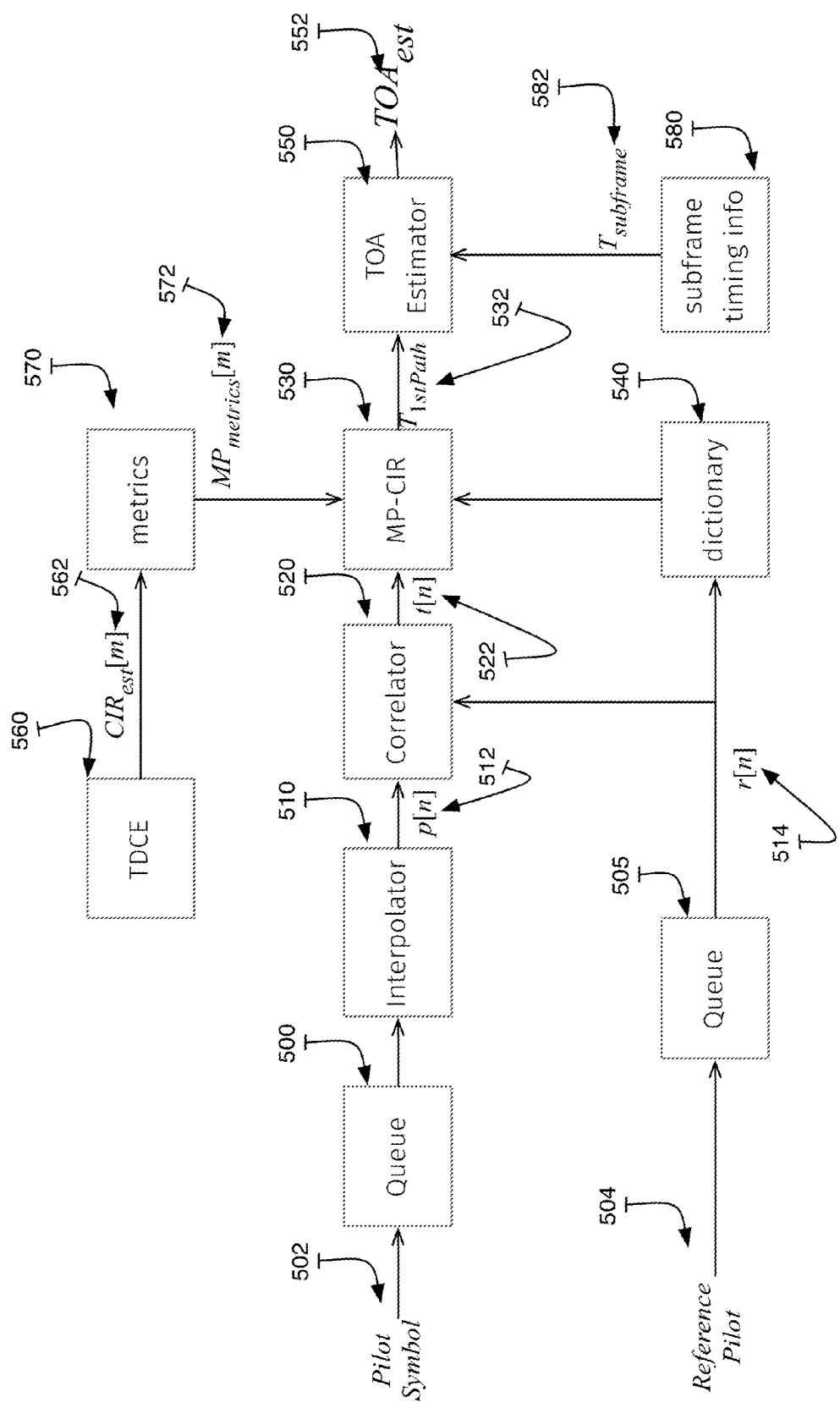
FIG. 5 shows the matching pursuit channel impulse response (MP-CIR) time of arrival estimator used to estimate the time of arrival for each antenna and for each location or estimation pilot symbol individually with further aid from a time domain channel estimator.

FIG. 5 shows another implementation of a receiver that improves the robustness and reliability of first path identification by modifying the matching pursuit channel impulse response (MP-CIR) estimator 430 of the FIG. 4 receiver to be responsive to metrics from a time domain channel estimator (TDCE) 560, resulting in the MP-CIR estimator 530. MP-CIR estimator 530 preferably also provides a more reliable measure of the first path time of arrival or delay. FIG. 5's queue 500, interpolator 510, correlator 520, dictionary 540 and time of arrival estimator 550 may be the same as those illustrated in FIG. 4. The time domain channel estimator 560 may, for example, have the form and operation described in U.S. Pat. No. 8,824,527, which patent is incorporated by reference here in its entirety.

The FIG. 5 receiver preferably includes a TDCE 560 that outputs or other circuitry that effectively calculates a CIR estimate, $CIR_{est}[m]$, 562 that is input to the signal to noise (SNR) metric processor 570. The SNR metric processor preferably determines a stopping_criterion_SNR[m] value in step 3.4 of the matching pursuit pseudocode procedure implemented by MP-CIR estimator 530. The OFDM receiver symbol error rate (SER) is sensitive to the accuracy of the CIR estimate and preferred receivers utilize this sensitivity to improve the performance of the matching pursuit stopping criteria. More specifically, the MP-CIR estimator 530 preferably uses a stopping_criterion_SNR[m] to stop the matching pursuit iterations for time of arrival (TOA) measurements, which results in a more robust TOA measurement. Furthermore, the $CIR_{est}[m]$ 562 preferably identifies all paths in the channel present for the time of arrival measurement. When that is done, the equation 3 SNR metric can be modified to define the stopping_criterion_SNR[m] as the ratio of all active paths' power to the remainder power due to noise. That is, $$SNR[m] = \frac{\sum_{l=\text{all signal paths}} |CIR_{est}[l]|^2}{\sum_{l=\text{all paths}} |CIR_{est}[l]|^2 - \sum_{l=\text{all signal paths}} |CIR_{est}[l]|^2}.$$ EQ. 5

Equation 5 improves on the SNR estimate by considering all paths that have signal, and not just the strongest path. This is particularly advantageous for Rayleigh fading channels, which are prominent in urban wireless communication deployments.

Figure 2:
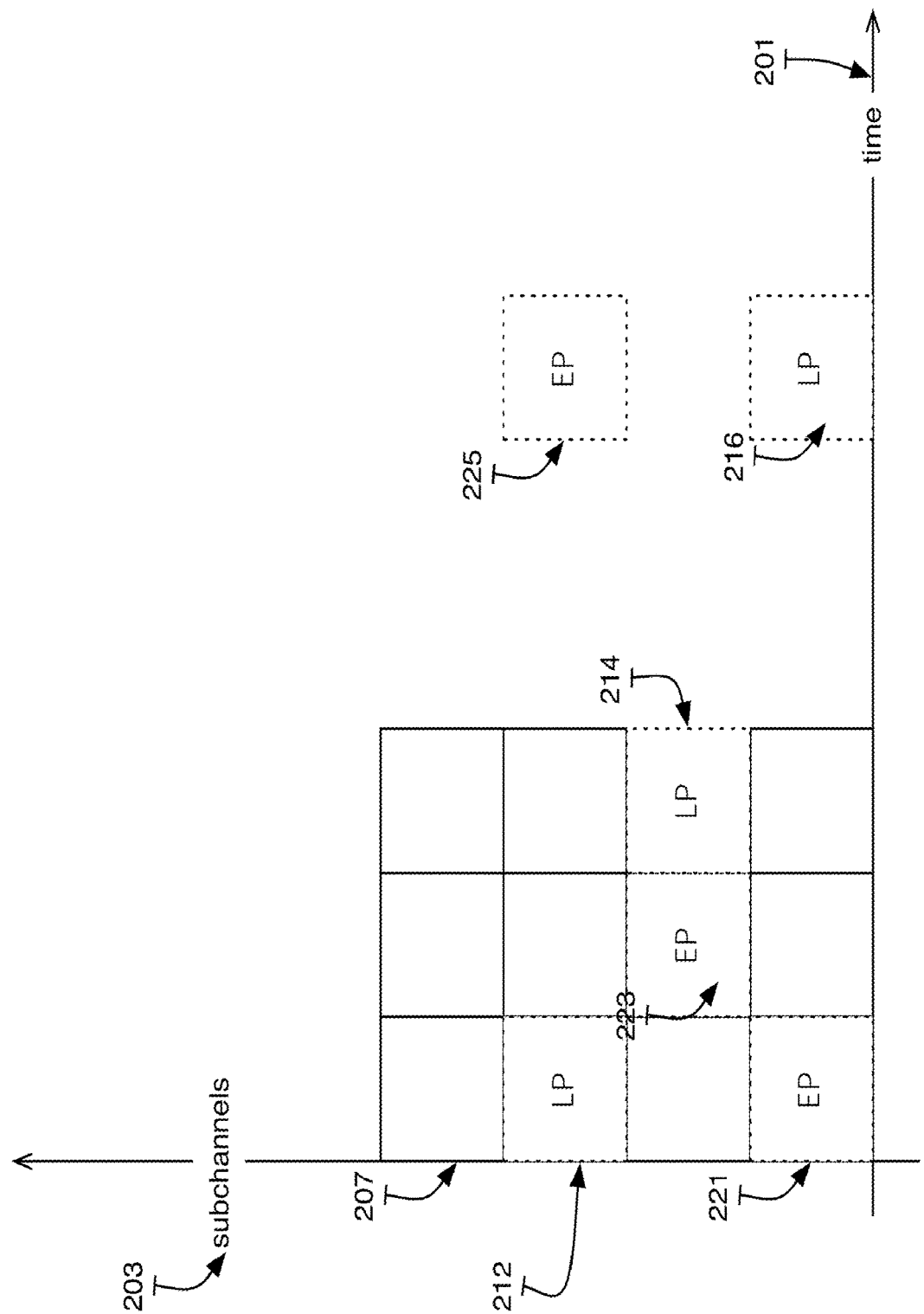
FIG. 2 shows a nominal grid of subchannels used in a method for wireless transmission of data and calibration information.

In the FIG. 5 receiver, the metrics processor 570 provides metrics characteristic of the channel impulse response (CIR) estimation, preferably calculated for each of the received symbols that has estimation pilot symbols, as illustrated in FIG. 2. Preferably, the metrics processor at least provides a measure for the CIR's time span. The TDCE 560 preferably provides a $CIR_{est}[m]$ 562 having a reduced time span, which is typically about half of the cyclic prefix length, for example 72 samples in the LTE standard. This pre-selection of 72 samples by the TDCE 560 offers greater reliability in the SNR metric processor 570. Further metrics preferably may include the received signal to noise ratio (SNR) and the channel's power delay profile (PDP). Since the TDCE is calculated repeatedly during normal receiver operation, preferably for each received symbol, these metrics can be provided regularly to the SNR metric processor 570 to improve on its accuracy. FIG. 5 shows the outputs (512, 514, 522) indexed as instances [n], for n an integer. $CIR_{est}[m]$ 562 and $MP_{metrics}[m]$ 572 are indexed as [m], for m an integer, and this denotes that they may be calculated at a different rate than variables indexed with [n].

Preferably the channel impulse response information from the TDCE 560 is used in SNR metric processor 570 for different implementations of a stopping criterion as required by step 3.4 in the matching pursuit pseudocode listed above. The TDCE 560 preferably determines CIRs for each received symbol; the MP-CIR estimator 530 is likely to measure time of arrival (TOA) less frequently than the TDCE 560 determines CIRs or the metrics processor 570 updates its metrics. Depending on the frequency of CIR measurements by the TDCE and requests for TOA measurements, it may be desirable to best determine how to average the increased rate of measurements by the TDCE 560 and the metrics processor 570. Preferably, the output of the TDCE 560 and the metrics processor 570 are accumulated and averaged in an appropriate way to provide desired inputs to the SNR metric processor 535.

The MP-CIR estimator 530 preferably identifies a first path and establishes a first path delay or time of arrival using matching pursuit as discussed above. The time of arrival estimator 550 may, for example, establish a time reference 582 at the beginning of the slot (subframe or frame) 580 relevant to the observed first path and then identify (count from the time reference) the sample associated with the first path and establish the time of arrival 552 from the sample count and the sampling rate.

Figure 6:
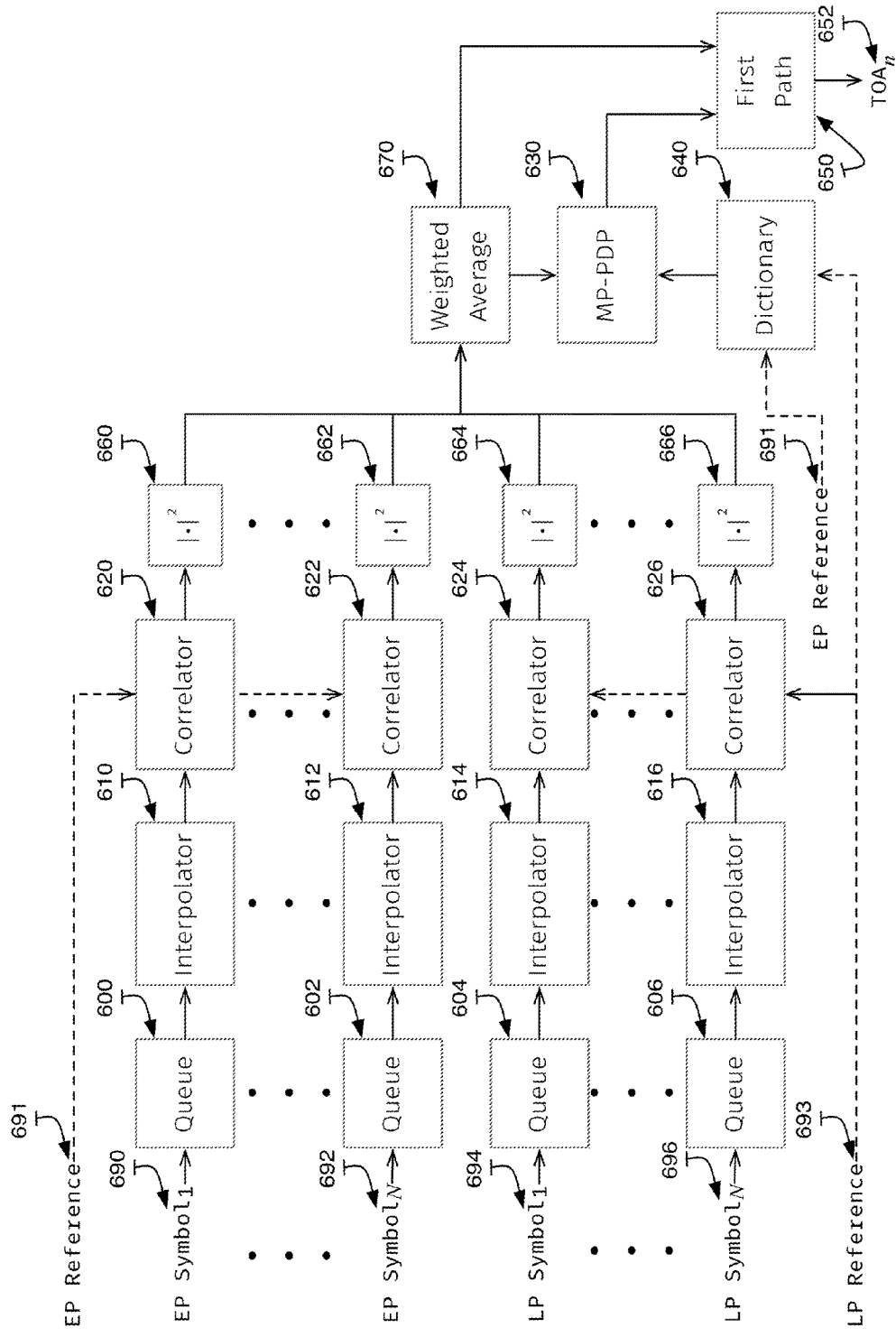
FIG. 6 shows the matching pursuit power delay profile (MP-PDP) time of arrival estimator used to estimate the time of arrival for each antenna and each location or estimation pilot symbol individually.

FIG. 6 shows another receiver implementation that provides a matching pursuit strategy responsive to a channel impulse response's power delay profile (PDP). The receivers of FIGS. 4 and 5 determine a matching pursuit channel impulse response each time the wireless network requests a time of arrival measurement. Determining a best time of arrival value may require 2×K total time of arrival calculations, as illustrated by equation 2. This many occurrences of the matching pursuit channel impulse response estimator calculations can place a demand on a mobile device's resources. Accordingly, a strategy that reduces the number of matching pursuit iterations and calculations for time of arrival determinations may be preferred in some circumstances.

The matching pursuit channel impulse response (MP-CIR) estimator 530 determines a channel's impulse response using inputs consisting of complex valued samples over the CIR's time span. Complex value computations are important for CIRs used for equalization, since phase is an important correction for an equalizer. In detecting the presence of a first path, the phase of each path is less likely to affect the result. The inventor has observed that the phase is comparatively unimportant using simulations comparing both approaches. An additional advantage is that the complexity in the matching pursuit implementation is reduced by using real-valued samples.

The receiver of FIG. 6 preferably has a queue 600 that accumulates the estimation pilot (EP) symbols 692 received by the first antenna designated for time of arrival (TOA) measurements. Interpolator 610 preferably reacts to these queued symbols to compute virtual EPs thus increasing the density of estimation pilot information among all queued EP symbols. The FIG. 6 receiver locally generates estimation pilot reference symbols based on the standard-dictated information. Alternately, the receiver can store previously generated EP reference symbols. U.S. Pat. No. 8,824,527 provides a discussion of generating pilot reference symbols and that patent is incorporated by reference in its entirety and for all purposes. Correlator 620 reacts to the locally-generated reference EP symbols 691 and the queued, received EP symbols to output the correlation between these two signals. Thus far, this is the same procedure as described for the queue 400, interpolator 410 and correlator 420 in FIG. 4. This process preferably is replicated for each of the N antennas (1≤n≤N) in the FIG. 6 receiver, with the Nth antenna shown to have queue 602, interpolator 612 and correlator 622. Optimization preferably determines if N physical instances of these modules 602, 610, 620 are to be implemented, or if a time-sharing method is feasible and so a smaller number of these circuits might be provided.

Preferably the process and circuitry described above and shown in FIG. 6 for the EP symbols is replicated for the LP symbols 696, 698, with the receiver using a locally generated reference LP signal 693, and to represent each of N antennas (1≤n≤N). FIG. 6 shows the first antenna to have queue 604, interpolator 614 and correlator 624 and shows the Nth antenna to have queue 606, interpolator 616 and correlator 626.

The FIG. 6 receiver determines a power delay profile (PDP) by computing the absolute value squared 660, 662, 664 or 666 of the signal output from the respective correlator 620, 622, 624, or 626 outputs. The absolute value operation removes the phase information, as discussed above. Unlike the correlator outputs in FIG. 4 or FIG. 5, the FIG. 6 power delay profiles can be coherently summed (since they have no phase information) to improve the robustness and reliability in TOA measurement. Preferably the FIG. 6 receiver determines a weighted average 670 of the various absolute value PDP measures received by the averaging circuitry 670. The FIG. 6 receiver may use any of various weighted averaging strategies. Preferably, the weighted averaging circuitry 670 uses a measure of SNR to determine the significance of each power delay profile 660, 662, 664, 666 it receives.

The output of the weighted average module 670 is a single power delay profile that is an improved measure of the active paths from the particular base station designated for the TOA measurement. Preferably, the MP-PDP estimator 630 is responsive to this single PDP estimate 672 to perform matching pursuit estimation on the power delay profile to identify the first path. The matching pursuit pseudocode, an appropriate dictionary and the associated process flow discussed above with respect to preferred implementations of the matching pursuit channel impulse response (MP-CIR) estimator 430 are preferably replicated for MP-PDP estimator 630, since the properties for estimating the MP-PDP are similar. Preferably the FIG. 6 receiver determines a dictionary 640 that encompasses the combined information from the estimation pilot (EP) 691 and the location pilot (LP) 693 reference signals with the same approach previously given for the dictionaries 440 and 540. Preferably then, MP-PDP estimator 630 reacts to the power delay profile estimate 672 and the dictionary 640 to determine a final estimate of the power delay profile or PDP, which identifies the first path. Time of arrival (TOA) estimator 650 reacts to this final PDP estimate 632 to determine the value of TOAn for base station n (1≤n≤N). This procedure is then repeated for each of the remaining base stations designated for TOA measurement.

Use of the FIG. 6 receiver or the method it illustrates can reduce the complexity of the circuitry and calculations due to the fewer instances of matching pursuit calculations as compared to the receivers and methods of FIGS. 4 and 5.

Figure 7:
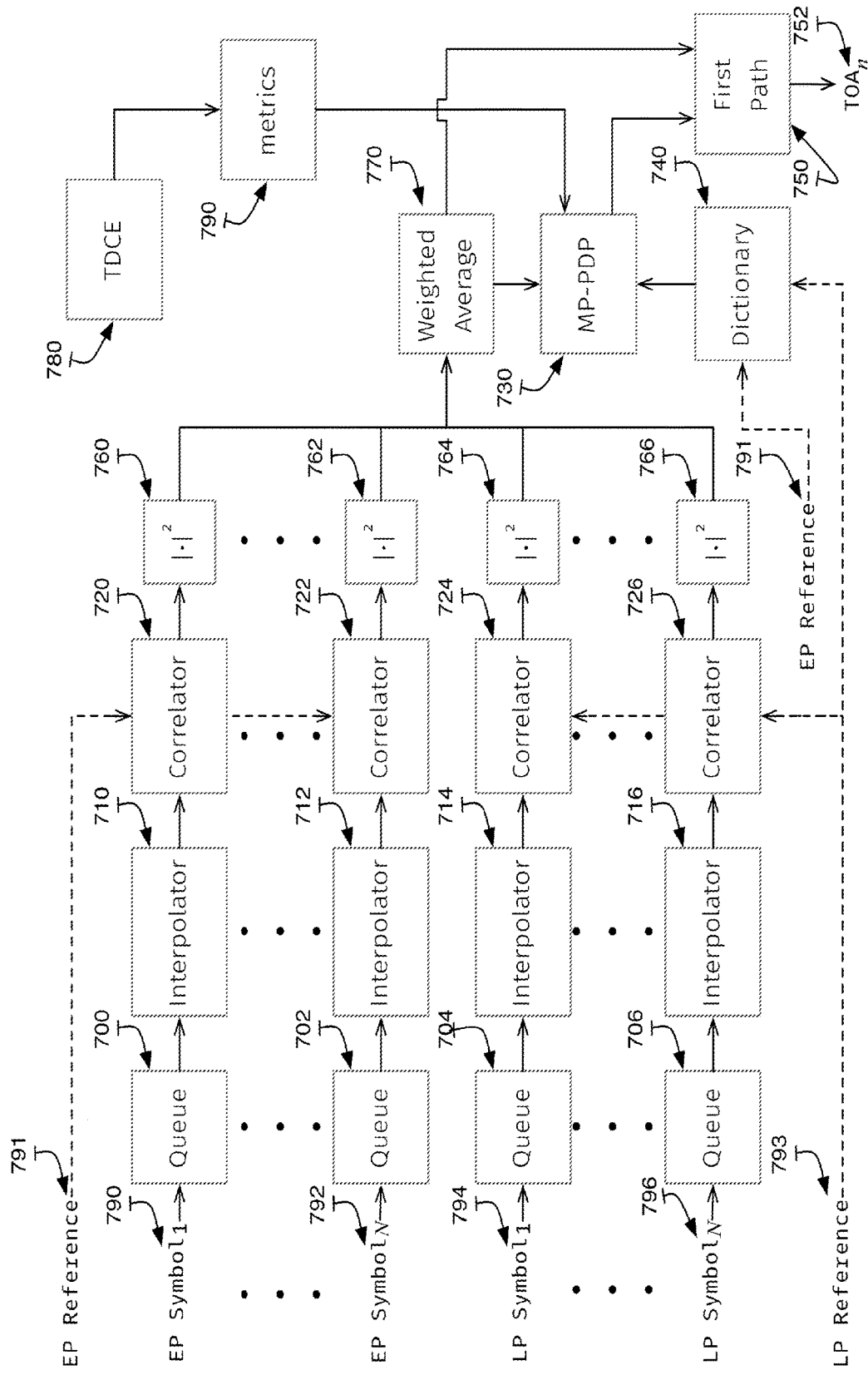
FIG. 7 shows the matching pursuit power delay profile (MP-PDP) time of arrival estimator used to estimate the time of arrival for each antenna and each location or estimation pilot symbol individually with further aid from a time domain channel estimator.

FIG. 7 shows another implementation of a receiver. In the FIG. 7 receiver, except as noted, the circuitry has similar structure and operation to that described for the FIG. 6 receiver and so that discussion is not repeated here. Similar numbering and identifiers indicate this similar structure and operation. In FIG. 7, the matching pursuit power delay profile (MP-PDP) estimator 730 is illustrated as also being responsive to metrics as measured from a time domain channel estimator (TDCE) 780. The time domain channel estimator 780 and metrics processor 790 may be selected to be the same as, or similar to, the TDCE 560 and metrics processor 570 shown in FIG. 5 and discussed above. Preferably, the TDCE 780 and metrics processor 790 of the FIG. 7 receiver at least provides a measure of the channel's power delay profile's time span. The TDCE 780 and metrics processor 790 might also provide further metrics including the received SNR. Since the FIG. 7 receiver determines the time domain channel estimate persistently, preferably for each received symbol, the FIG. 7 receiver has these metrics available to improve on the performance of the MP-PDP estimator 730. As discussed above with respect to the FIG. 5 receiver, the metrics characteristic of the channel provided by the TDCE can be incorporated into the stopping criterion using in step 3.4 of the matching pursuit pseudocode, which the MP-PDP estimator 730 preferably also implements. TDCE 780 preferably calculates CIRs for each received symbol, metrics processor 790 preferably determines metrics for each received symbol and TOA measurements are likely to be less frequent. Depending on the frequency of CIR and metrics measurements by the TDCE and metrics processor and depending on the requests for TOA measurements, those skilled in the art can best determine how to average the increased rate of measurements and metrics by the TDCE 780 and metrics processor 790. The FIG. 6 and FIG. 7 receivers both determine the time of arrival from the first path identification in a manner similar to those illustrated in FIGS. 4 and 5.

The measurement for any $TOA_n$ has a granularity that is dependent on the sampling interval for the incoming signal. In the case of the LTE standard, the interval between samples depends on the bandwidth for any given base station. The period or spacing between samples in LTE is $T_s=1/30\times10^6$ seconds. Light in a vacuum travels roughly ten meters in one $T_s$ period (i.e., light travels a distance equal to the speed of light times the LTE sampling period $T_s$). Fractional $T_s$ measurements are needed to allow for distance granularities (resolution) of less than ten meters.

Figure 8:
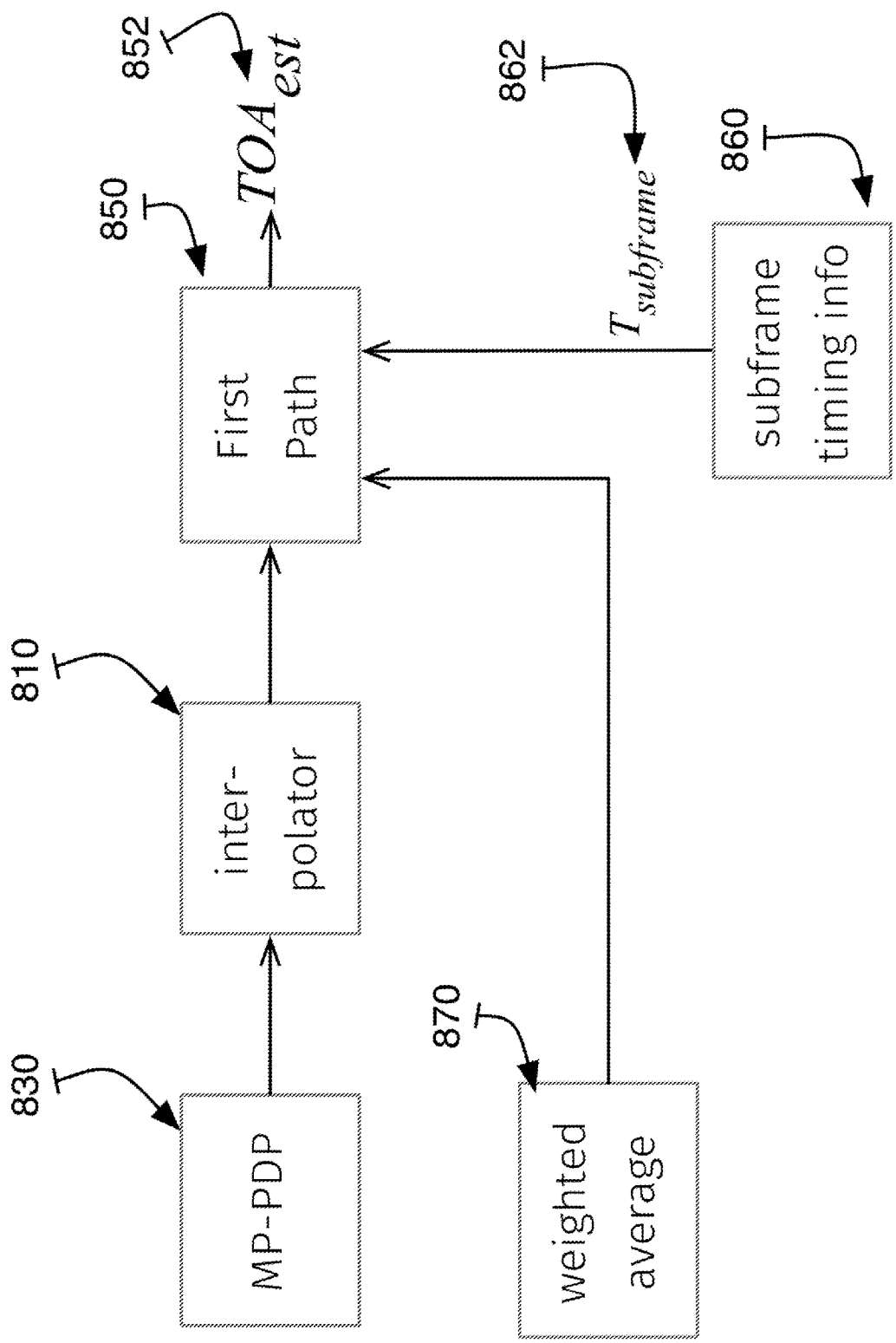
FIG. 8 shows another aspect of a receiver and, more particularly, an interpolation module that can be used when desired to provide greater granularity to the matching pursuit estimate, for example, to provide fractional estimation of the time of arrival estimate.

FIG. 8 shows a receiver configuration that can provide greater time of arrival and position granularity. The FIG. 8 configuration could be used in any of the time of arrival estimators shown in the drawings or discussed above by adding an interpolator 810 following the matching pursuit estimator and other appropriate circuitry so that the interpolator can receive multiple time of arrival signals from different servers over different paths or through different antennas over different paths. FIG. 8 specifically shows interpolator 810 preferably positioned to receive the first path identification (650, 750) output from the matching pursuit power delay profile time of arrival estimators (630, 730) shown in FIGS. 6 and 7 respectively. The MP-PDP estimator 830 shown in FIG. 8 corresponds to the MP-PDP estimators 630, 730 shown in FIGS. 6 and 7 and the first path processing circuitry 850 corresponds to and performs the same functions as the first path processors 650, 750 shown in FIGS. 6 and 7.

The matching pursuit power delay profile estimator 830 will likely identify multiple candidate paths of arrival and further identifies a first path of arrival. Upon the identification of a first path of arrival, the MP-PDP estimator 830 preferably identifies another path and preferably the last path of arrival. The MP-PDP estimator 830 preferably identifies a first path of arrival at time $t_{1st}$ having magnitude $y_{1st}$ and identifies a last path of arrival at time $t_L$ having a magnitude $y_L$. Interpolator 810 preferably implements an interpolation scheme to estimate the amplitude $y_{interp}$ at time $t_{interp}$, such that $t_{1st}>t_{interp}>t_L$. For example, linear interpolation may be used. This new value of $t_{interp}$ is used in the first path processor (650, 750, 850) instead of $t_{1st}$, as alternatively suggested in FIG. 6 and FIG. 7. The FIG. 8 receiver may further include a weighted average calculator 870 similar in construction and function to the weighted average calculators 670 and 770 shown in FIGS. 6 and 7. Preferably the first path processor 650, 750, 850 receives and uses the output of the weighted average processor to weight the signals from each antenna in identifying the first path and processing the related information.

The FIG. 8 receiver, like the other receivers discussed here (including FIGS. 6 and 7, although it is not illustrated there), obtains the slot or subframe timing information 860 and provides the reference time $T_{subframe}$ 862 to the first path processor 850 to determine the time of arrival $TOA_{est}$ 852.

Various implementations of receivers and receiving methods have been described to demonstrate measuring the time of arrival (TOA) for a specified signal from a designated base station in a wireless network. As described, the receivers may have varying numbers of antennas and may use different pilot signals. Preferably these receivers and receiving methods react to the received symbols from a wireless system exhibiting multiple access schemes. As prescribed in the standards, the networks or base stations can use these TOA measures to make additional measures that can determine receiver location in a network serviced by multiple base stations.

The present invention has been described in terms of certain preferred embodiments. Those of ordinary skill in the art will appreciate that various modifications and alterations could be made to the specific preferred embodiments described here without varying from the teachings of the present invention. Consequently, the present invention is not intended to be limited to the specific preferred embodiments described here but instead the present invention is to be defined by the appended claims. Other systems, methods, features or advantages will be or may become apparent to those skilled in the art of wireless receivers, networks and measurements required by implementations of a standard.

What is claimed is:

1. A method of determining time of arrival in a wireless network, comprising:
    receiving at a receiver from a wireless network a signal comprising a plurality of orthogonal frequency division multiplexing signals from a single base;
    extracting location pilot signals from the received signal;

determining a power delay profile corresponding to the extracted location pilot signals;
identifying a first path associated with the extracted location pilot signals by performing matching pursuit estimation on the power delay profile for the extracted location pilot signals;
determining a time of arrival based on the identified first path.

2. The method of claim 1, wherein the extracting location pilot signals comprises comb filtering in a frequency domain.

3. The method of claim 1, wherein the identifying a first path uses both location pilot signals and estimation pilot signals.

4. The method of claim 3 further comprising comb filtering to extract estimation pilots.

5. The method of claim 3 further comprising interpolating from received location pilot signals to generate virtual location pilot signals for received OFDM symbols that lack a received location pilot signal, values of the virtual location pilot signals determined from other received OFDM symbols.

6. The method of claim 1 further comprising determining a signal to noise measure for a channel impulse response and stopping matching pursuit estimation in response to the signal to noise measure.

7. The method of claim 1 further comprising correlating between a plurality of received location pilot signals and a locally generated reference signal and providing a result of the correlating as an input to the determining a power delay profile; and
determining a channel impulse response based on the power delay profile, and wherein the identifying the first path is responsive to the channel impulse response.

8. The method of claim 7, wherein the matching pursuit estimation uses location pilot signals and estimation pilot signals.

9. The method of claim 8 further comprising determining a signal to noise measure for a channel impulse response and stopping matching pursuit estimation in response to the signal to noise measure.

10. The method of claim 9 further comprising interpolating from received location pilot signals to generate virtual location pilot signals.

11. The method of claim 1, further comprising interpolating between two or more sets of path information to generate the time of arrive arrival with a granularity smaller than defined by a system sampling period.

12. The method of claim 1, wherein the matching pursuit estimation is performed using a location pilot power delay profile and an estimation pilot power delay profile.

13. The method of claim 12, further comprising generating virtual location pilot signals and generating virtual estimation pilot signals.

14. The method of claim 13, further comprising interpolating between two or more sets of path information to generate the time of arrival with a granularity smaller than defined by a system sampling period.

15. A method of determining time of arrival in a wireless network, comprising:
receiving at a receiver from a wireless network a received signal comprising orthogonal frequency division multiplexing signals from a single base station, the received signal comprising location pilot signals and estimation pilot signals;
extracting pilot signals from the received signal;
determining a power delay profile for the extracted pilot signals;
identifying a first path associated with the extracted pilot signals by performing matching pursuit estimation on the power delay profile for the extracted pilot signals; and
determining a time of arrival for the identified first path.

16. The method of claim 15, wherein the extracted pilot signals comprise extracted location pilot signals and extracted estimation pilot signals, the method further comprising determining a channel impulse response based on the power delay profile, and wherein the identifying the first path is responsive to the channel impulse response.

17. The method of claim 16, further comprising interpolating between two or more sets of path information to generate the time of arrival with a granularity smaller than defined by a system sampling period.

18. A receiver having a time of arrival function, the receiver comprising:
memory coupled to store extracted pilot signals extracted from a received OFDM signal comprising position pilot signals and estimation pilot signals;
an interpolator coupled to receive the extracted pilot signals and to generate virtual pilot signals;
a correlator that correlates the extracted pilot signals and the virtual pilot signals with a locally generated reference signal and outputs an initial pilot channel impulse response;
a power delay profile generator coupled to the correlator and that outputs a power delay profile responsive to the initial pilot channel impulse response;
a matching pursuit estimator responsive to the power delay profile, the matching pursuit estimator identifying a first path responsive to the power delay profile; and
a time of arrival estimator responsive to the identified first path to determine a time of arrival for the first path.

19. The receiver of claim 18, wherein the extracted pilot signals comprise extracted estimation pilot signals.

20. The receiver of claim 18, wherein the extracted pilot signals comprise extracted location pilot signals and extracted estimation pilot signals.

21. The receiver of claim 18, further comprising a time of arrival interpolator coupled to receive path information from the matching pursuit estimator, the time of arrival interpolator adapted to provide interpolated path information to the time of arrival estimator so that the time of arrival estimator generates the time of arrival with a granularity smaller than defined by a system sampling period.

22. The receiver of claim 18, wherein the memory stores a first set of extracted pilot signals and a second set of extracted pilot signals, and wherein the power delay profile generator generates a first power delay profile responsive to the first set of extracted pilot signals and generates a second power delay profile responsive to the second set of extracted pilot signals, the receiver further comprising:
a weighted average circuit coupled to receive the first power delay profile and the second power delay profile and in response outputting a weighted average power delay profile.

23. The receiver of claim 22, wherein the matching pursuit estimator identifies the first path based on the weighted average power delay profile.

24. The receiver of claim 23, wherein the receiver generates the first power delay profile and the second power delay profile in parallel.

25. The receiver of claim 23, wherein the power delay profile generator generates the first power delay profile and the second power delay profile using common circuitry.

26. The receiver of claim 23, wherein the first set of extracted pilot signals comprise location pilot signals and the second set of extracted pilot signals comprise estimation pilot signals.

\* \* \* \* \*